US012222323B2

(12) United States Patent
Auffray

(10) Patent No.: US 12,222,323 B2
(45) Date of Patent: Feb. 11, 2025

(54) METHOD AND DEVICE FOR ANALYZING THE CONFORMITY OF AN INTERPOSITION MASTIC INTEGRATED INTO A STRUCTURE, IN PARTICULAR OF AN AIRCRAFT

(71) Applicant: AIRBUS OPERATIONS (SAS), Toulouse (FR)

(72) Inventor: Stephane Auffray, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 434 days.

(21) Appl. No.: 17/704,886

(22) Filed: Mar. 25, 2022

(65) Prior Publication Data

US 2022/0308017 A1 Sep. 29, 2022

(30) Foreign Application Priority Data

Mar. 26, 2021 (FR) ...................................... 2103078

(51) Int. Cl.
*G01N 29/07* (2006.01)
*G01B 17/02* (2006.01)
*G01N 29/34* (2006.01)

(52) U.S. Cl.
CPC ............. *G01N 29/07* (2013.01); *G01B 17/02* (2013.01); *G01N 29/348* (2013.01);
(Continued)

(58) Field of Classification Search
CPC ................. G01N 29/07; G01N 29/348; G01N 2291/011; G01N 2291/0234;
(Continued)

(56) References Cited

U.S. PATENT DOCUMENTS 5,631,424 A * 5/1997 Nieters .................. G01N 29/07
73/598
2006/0266123 A1 * 11/2006 Georgeson ........... G01N 29/043
73/634

(Continued)

FOREIGN PATENT DOCUMENTS

RU 2 029 225 2/1995

OTHER PUBLICATIONS

R.J. Freemantle, et al., "Rapid phased array ultrasonic imaging of large area composite aerospace structures", Insight—Non-Destructive Testing and Condition Monitoring, Mar. 1, 2005, 8 pages.

(Continued)

*Primary Examiner* — Tarun Sinha
(74) *Attorney, Agent, or Firm* — Nixon & Vanderhye P.C.

(57) ABSTRACT

A device (1) including an ultrasonic measuring unit (7) that sends an ultrasonic signal (S1) into a structure (2) and measures the amplitude of the ultrasonic signal (S2) reflected by the structure (2), a processing unit for determining the thickness of the interposition mastic (3) from the measurements of the ultrasonic measuring unit (7) and with the aid of a propagation model of the interposition mastic (3) which provides a thickness value of the interposition mastic (3) depending on the propagation time of the ultrasonic signal in the interposition mastic (3) as well as auxiliary data, and a processing unit for deducing a conformity or a lack of conformity of said interposition mastic (3) and the presence of cuttings from the thickness of the interposition mastic (3), the device (1) carrying out a conformity checking that is accurate, fast and reliable without having to disassemble the structure (2).

14 Claims, 3 Drawing Sheets

(52) U.S. Cl.
CPC ............... *G01N 2291/011* (2013.01); *G01N 2291/0234* (2013.01); *G01N 2291/02854* (2013.01); *G01N 2291/2694* (2013.01)

(58) Field of Classification Search
CPC . G01N 2291/02854; G01N 2291/2694; G01N 2291/0231; G01N 2291/0235; G01N 2291/051; G01N 2291/102; G01N 29/0645; G01N 29/326; G01N 29/4427; G01N 29/4454; G01N 29/043; G01B 17/02

See application file for complete search history.

(56) References Cited

U.S. PATENT DOCUMENTS

| | | |
|---|---|---|
| 2010/0043194 A1 | 2/2010 | Houis et al. |
| 2018/0143164 A1 | 5/2018 | Rousseau et al. |
| 2018/0340858 A1* | 11/2018 | Jahanbin ................ G01N 29/11 |
| 2019/0022737 A1* | 1/2019 | Ma ......................... B21J 15/12 |

OTHER PUBLICATIONS

R.L. Vijaya Kumar, et al., "Some studies on evaluation of degradation in composite adhesive joints using ultrasonic techniques", Ultrasonics, IPC Science and Technology Press Ltd. Guildford, GB, vol. 53, No. 6, Mar. 7, 2013, pp. 1150-1162, 13 pages.

Search Report for FR Application No. 2103078 dated Dec. 3, 2021, 3 pages.

\* cited by examiner

METHOD AND DEVICE FOR ANALYZING THE CONFORMITY OF AN INTERPOSITION MASTIC INTEGRATED INTO A STRUCTURE, IN PARTICULAR OF AN AIRCRAFT

RELATED APPLICATION

This application incorporates by reference and claims priority to French patent application 2103078, filed Mar. 26, 2021.

TECHNICAL FIELD

The present invention relates to a method and device for analyzing the conformity of a faying-surface mastic integrated into a structure, in particular of an aircraft, said structure comprising at least two partially superposed parts between which is arranged the faying-surface mastic.

BACKGROUND

Although not exclusively, this method is more particularly intended to provide assistance in the implementation of assembly operations on aircraft production lines, and in particular on the production lines of cargo planes.

The envisioned structure comprises at least two partially superposed parts, panels or skins for example, between which the faying-surface mastic is arranged. This structure may especially comprise a portion of the fuselage of an aircraft. More particularly, it may be a question of fastening two segments of the fuselage of an aircraft or of fastening a panel to one portion of the fuselage of an aircraft.

In the context of the present invention, by faying-surface mastic what is meant is any polymer product capable of being placed between two superposed parts, and having sealing properties and properties that result in adhesion to these parts. Such a faying-surface mastic may also have other characteristics or properties, depending on the envisioned application, such as for example properties that result in protection against corrosion.

Said method is particularly well suited to the type of aircraft assembly operations referred to as OWA operations, OWA being the acronym of "one-way assembly". As known, such OWA operations do not require disassembly, cleaning and re-assembly to be carried out after adjustment, tufting, drilling and installation of fastenings, unlike other conventional assembly operations. Such disassembly-free operations are therefore particularly advantageous in terms of time and cost.

Of course, whatever the mode of assembly in question, correct flow of the faying-surface mastic applied between the two superposed parts is necessary. Flow of the faying-surface mastic may especially be disrupted by the presence of swarf generated by drilling the parts to create apertures intended to receive fastening elements such as rivets. For the faying-surface mastic to be able to perform its functions, in particular its sealing function, there must be no swarf between the parts, and the faying-surface mastic must be distributed in the required manner.

To verify this conformity, currently only a visual verification of the assembled structure is carried out. A general quality that is judged unacceptable is the trigger of a protocol requiring the parts to be disassembled, then cleaned and reassembled.

However, although effective in certain cases, visual observation has a reliability that is not optimal. Specifically, it is impossible to see inside the structure. Thus, the presence of a small amount of swarf may go unnoticed or indeed a quality wrongly judged as slightly unacceptable may be the trigger of baseless disassembly, wasting time. By way of illustration, in the context of the fuselage of a cargo plane, implementation of a protocol requiring disassembly, cleaning and reassembly may take several hours.

There is therefore a need to provide a solution that would allow a—non-visual—verification of an assembled structure such as described above to be carried out, while not only being precise, rapid and reliable, but also not requiring disassembly of the structure.

SUMMARY

The invention may be embodied as a method and/or device for analyzing the conformity of a faying-surface mastic integrated into a structure, in particular of an aircraft, said structure comprising at least two partially superposed parts between which is arranged the faying-surface mastic.

The method may comprise at least one sequence of steps comprising:
- a measuring step, implemented by an ultrasonic measuring unit, consisting in generating an ultrasonic signal, in sending the ultrasonic signal to the structure from at least one measurement point and in measuring the amplitude of the ultrasonic signal sent back by said structure as a function of a corresponding time-of-flight;
- a first processing step, implemented by a first processing unit, consisting in determining the thickness of the faying-surface mastic at said measurement point, on the basis of the measurements taken in the measuring step and using a predetermined propagation model of said faying-surface mastic and auxiliary data, said propagation model being characteristic of the type of faying-surface mastic and delivering a thickness value of the faying-surface mastic depending on the time-of-flight of the ultrasonic signal through the faying-surface mastic and on said auxiliary data; and
- a second processing step, implemented by a second processing unit, consisting in deducing, from the thickness of the mastic determined in the first processing step, at least a conformity or a non-conformity of said faying-surface mastic.

Thus, by virtue of said predetermined propagation model of the faying-surface mastic and of the ultrasonic measurements taken from outside the structure, it is possible to verify whether the faying-surface mastic is in accordance (especially in terms of thickness) with expectations, without disassembling the structure. Thus, a method allowing a precise, rapid and reliable verification of the conformity of the faying-surface mastic integrated into the structure is obtained.

Advantageously, said auxiliary data comprise at least: temperature; and the time for which the faying-surface mastic has been integrated into the structure.

In the context of the present invention, the method may be used to take measurements at one particular measurement point of the structure. However, the measuring step may comprise taking measurements at a plurality of different measurement points of the structure, for example allowing all of a given area to be analyzed, and the first processing step consists in determining the thickness of the faying-surface mastic at said plurality of measurement points of the structure.

In one embodiment, the second processing step also consists in determining the presence or absence of swarf in the structure. This embodiment allows the presence of swarf, especially metal swarf, in particular in proximity to fastening elements of the structure, to be identified and located. These verifications may therefore be performed without having to disassemble the structure.

Advantageously, the method comprises, in addition, a preliminary step, implemented before said sequence of steps and consisting in determining said propagation model at least of said type of faying-surface mastic. In one particular embodiment, the preliminary step consists in determining a propagation model for each of a plurality of different types of faying-surface mastic.

Moreover, advantageously, to determine a conformity of the faying-surface mastic, the second processing step consists in verifying, for each of a plurality of rectangular cells of the structure, each of said rectangular cells being defined by four fastening points provided to secure parts of the structure, that the thickness of the faying-surface mastic is comprised in a predetermined first interval of values at the center of the rectangular cell and that the thickness of the faying-surface mastic is smaller than a predetermined value at the corners of the rectangular cell.

Furthermore, advantageously, the measuring step consists in generating an ultrasonic signal (namely an ultrasonic pulse) having a frequency comprised between 10 MHz and 15 MHz.

The present invention also relates to a device for analyzing the conformity of a faying-surface mastic integrated into a structure such as described above.

According to an embodiment of the invention, said device comprises at least:
- an ultrasonic measuring unit configured to generate an ultrasonic signal, to send the ultrasonic signal to the structure from at least one measurement point, and to measure the amplitude of the ultrasonic signal sent back by said structure as a function of a corresponding time-of-flight;
- a first processing unit configured to determine the thickness of the faying-surface mastic at said measurement point, on the basis of the measurements taken by the ultrasonic measuring unit and using a predetermined propagation model of said faying-surface mastic and auxiliary data (such as temperature and the time for which the faying-surface mastic has been deposited in the structure), said propagation model being characteristic of the type of faying-surface mastic and delivering a thickness value of the faying-surface mastic depending on the time-of-flight of the ultrasonic signal through the faying-surface mastic, and on said auxiliary data; and
- a second processing unit configured to deduce, from the mastic thickness determined by the first processing unit, at least a conformity or a non-conformity of said faying-surface mastic.

In one embodiment, the second processing unit is configured to also determine the presence or absence of swarf in the structure.

The device such as described above may be used in various applications, and especially to carry out verifications of conformity during aircraft assembly operations, especially "one-way assembly" operations. It may also be used to validate new steps or actions of assembly processes. It is applicable to various types of structure, formed for example from metal parts, composite parts, or at least one metal part and one composite part.

BRIEF DESCRIPTION OF THE FIGURES

The appended figures facilitate a clear understanding as to how the invention may be carried out. In these figures, identical references have been used to designate similar elements.

DETAILED DESCRIPTION

Figure 1:
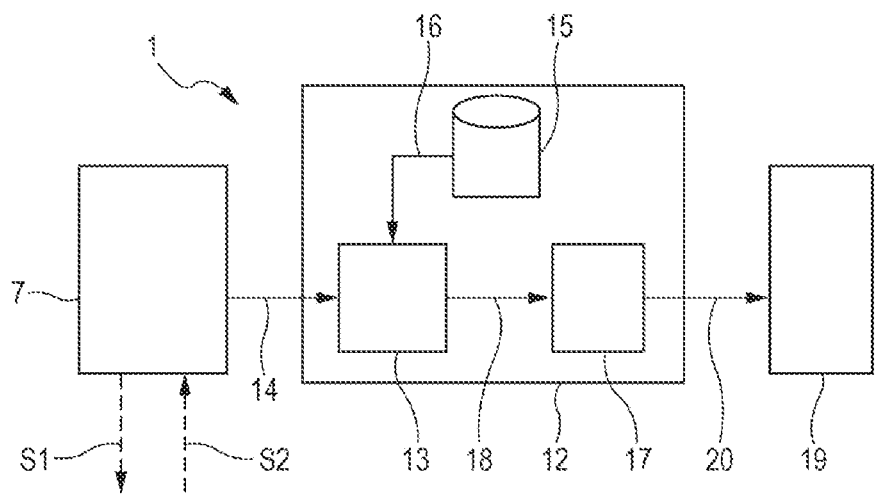
FIG. 1 is the schematic diagram of one particular embodiment of an analyzing device.

The device 1 schematically shown in FIG. 1 and allowing the invention to be illustrated is a device for analyzing the conformity of a faying-surface mastic 3 integrated into a structure 2 (FIG. 2), and in particular into a structure of an aircraft.

Figure 2:
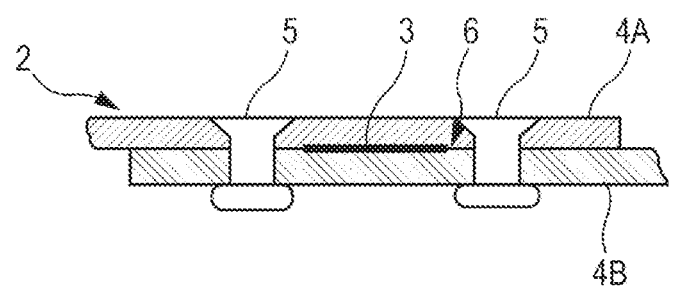
FIG. 2 is a partial cross-sectional view of a structure intended to be analyzed using the analyzing device.

In the context of the present invention, the structure 2 comprises at least two parts 4A and 4B, which are for example made of metal or of composite, and between which is arranged the faying-surface mastic 3, as shown in FIG. 2.

The envisioned structure 2 therefore comprises at least two parts 4A and 4B, for example planar or curved parts, such as panels or skins, that are at least partially superposed (i.e. that make contact with each other via at least one portion of their surfaces), and between which is arranged the faying-surface mastic 3. This structure 2 may especially correspond to a portion of the fuselage of an aircraft, in particular of a cargo plane. By way of illustration, it may be a question of two fuselage segments that are assembled or of a panel that is fastened to one portion of the fuselage. In the example of FIG. 2, fastening elements 5, in the present case rivets, which are intended to fasten the parts 4A and 4B to each other, have also been shown.

The structure 2 may also comprise more than two partially superposed parts, for example three or four parts as specified below, with, each time, faying-surface mastic 3 arranged between two superposed parts.

In the context of the present invention, the faying-surface mastic 3 is a polymer product (capable of being placed between two superposed parts) that has sealing properties and properties that result in adhesion to these parts. Such a faying-surface mastic may also have other characteristics or properties, depending on the envisioned application, such as for example properties that result in protection against corrosion. It may especially be a fast-curing mastic.

The faying-surface mastic 3 may thus, especially, serve to seal some or all of the region of overlap (or of superposition) 6 of the two superposed parts 4A and 4B (FIG. 2).

Figure 3:
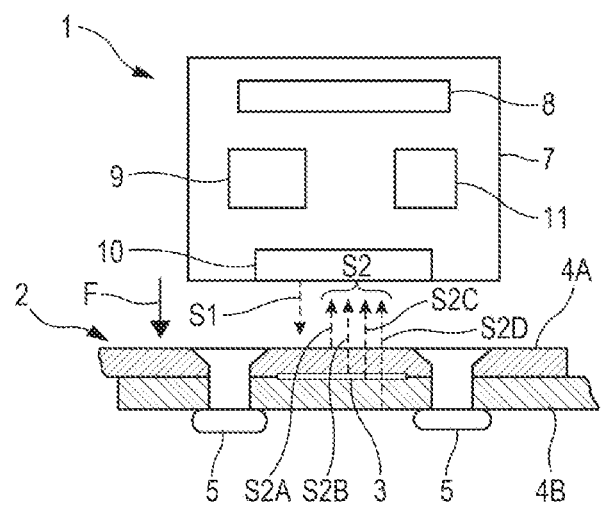
FIG. 3 schematically illustrates an analysis being carried out on the structure of FIG. 2.

The device 1 comprises, as shown in FIG. 1, an ultrasonic measuring unit 7. This ultrasonic measuring unit 7 is configured:
- to generate an ultrasonic signal S1. The ultrasonic signal S1 may be an ultrasonic pulse;

to transmit the ultrasonic signal S1 (thus generated) into the structure 2 from at least one measurement point, as detailed below, in the direction illustrated by an arrow F in FIG. 3, e.g., orthogonally to the external surface of the part 2 at the measurement point; and to measure the amplitude of the ultrasonic signal S2 sent back by said structure 2, in the direction opposite to the direction F (FIG. 3). The ultrasonic signal S2 corresponds to the portion of the ultrasonic signal S1 that is sent back by the structure 2.

To do this, in one particular embodiment, the ultrasonic measuring unit 7 comprises, as shown in FIG. 3: an element 8 for controlling the ultrasonic measuring unit 7; an element 9 for generating the ultrasonic signal S1; a transceiver element 10 provided for example with an antenna, for transmitting the generated ultrasonic signal S1 and for receiving the ultrasonic signal S2 sent back by the structure 2; and an element 11 for measuring the received ultrasonic signal S2.

The measuring element 11 takes a measurement of the amplitude of the ultrasonic signal S2 received as a function of the time-of-flight, i.e. of the time between the transmission of the ultrasonic signal S1 by the transceiver element 10 and reception (after reflection from the structure) of the ultrasonic signal S2 by the transceiver element 10.

The propagation of the ultrasonic signal through the structure 2 is characterized by characteristic (reflection) peaks, which correspond to discontinuities in acoustic impedance in the structure, at the interfaces of different materials, and especially at the interface between the part 4A and the faying-surface mastic 3 and at the interface between the faying-surface mastic 3 and the part 4B.

In FIG. 3, various signal portions S2A, S2B, S2C and S2D of the ultrasonic signal S2, which portions are sent back by different interfaces, have been illustrated. By way of illustration:

the signal portion S2A corresponds to the peak P1 in reflection (FIG. 6) on entering the part 4A;

the signal portion S2B corresponds to the peak P2 in reflection (FIG. 6) on exiting the part 4A.

In one embodiment, the ultrasonic signal (or pulse) S1 has a frequency comprised between 10 MHz and 15 MHz. The use of an ultrasonic signal of such high frequency allows a maximum resolution to be achieved in relation to the analysis carried out. Specifically, identification of the peaks is facilitated by such high frequencies of the ultrasonic signal used.

Said device 1 also comprises, as shown in FIG. 1, a processing module 12. This processing module 12 comprises:

a processing unit 13 configured to determine the thickness of the faying-surface mastic 3 at the one or more measurement points in question. The processing unit 13 determines the thickness of the faying-surface mastic on the basis of the measurements (carried out by the ultrasonic measuring unit 7), which are received via a link 14, and using a predetermined propagation model of said faying-surface mastic, which is for example incorporated into a database 15 (connected via a link 16 to the processing unit 13). The processing unit 13 also takes into account auxiliary data (especially temperature and the time for which the faying-surface mastic has been applied in the structure), as specified below. The propagation model is characteristic of the type of faying-surface mastic used and delivers a thickness value of the faying-surface mastic depending on the time-of-flight of the ultrasonic signal through the faying-surface mastic, and on said auxiliary data as also specified below; and a processing unit 17 configured to deduce from the thickness of the mastic (which thickness is determined by the processing unit 13 and received via a link 18) a conformity or non-conformity of the faying-surface mastic.

Thus, the device 1 is able, especially by virtue of the predetermined propagation model of the faying-surface mastic, and of the ultrasonic measurements carried out by the ultrasonic measuring unit 7, to verify whether the faying-surface mastic 3 is in accordance (especially in terms of thickness) with expectations. Thus, a device 1 allowing a precise, rapid and reliable verification to be carried out, without disassembling the structure 2, is obtained.

In one embodiment, the processing unit 17 is configured to also determine the presence or absence of swarf in the structure 2. This embodiment allows, where appropriate, swarf to be identified and located, in particular in proximity to the fastening elements 5 (FIG. 2).

All of these verifications are therefore performed without having to disassemble the structure 2. The device 1 is thus particularly well suited to carrying out analyses during the type of aircraft assembly operations referred to as OWA operations, OWA being the acronym of "one-way assembly".

Said device 1 also comprises a set 19 of means or devices (not shown individually) that are configured to deliver, to an operator or to a system, the result (received via a link 20) of the processing operation implemented by the processing unit 17. To do this, the set 19 may, especially, comprise:

a conventional means for displaying the result (conformity or nonconformity of the faying-surface mastic; presence or absence of swarf and potentially the location thereof);

a conventional means for printing the result;

a conventional means for transmitting the result, for example via a wired link or a wireless link.

Figure 4:
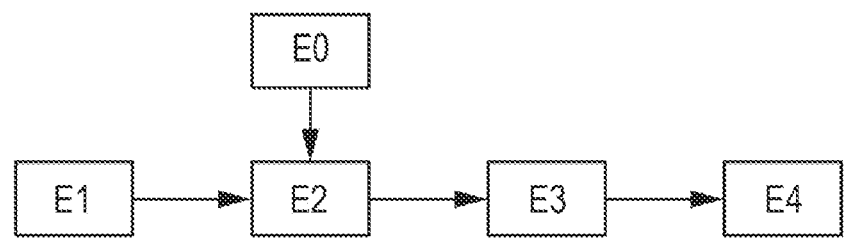
FIG. 4 schematically shows the main steps of an analyzing method.

The device 1 such as described above, is able to implement a method P for analyzing the conformity of a faying-surface mastic integrated into a structure, for example a structure such as shown in FIG. 2. Said method P, which is schematically shown in FIG. 4, is described below, especially with reference to FIGS. 5 and 6.

The method P comprises a measuring step E1 (FIG. 4), which is implemented by the ultrasonic measuring unit 7 (FIG. 1). This measuring step E1 consists in generating the ultrasonic signal S1, and in emitting the ultrasonic signal S1 (thus generated) into the structure 2 from at least one measurement point, in the direction F illustrated in FIG. 3.

In the context of the present invention, the method P may be used to carry out measurements at a particular measurement point of the structure 2, for example in a place where it is considered that there might be a problem with conformity.

However, the measuring step E1 may include carrying out measurements at a plurality of different measurement points of the structure 2, for example allowing all of a given area of this structure 2 and in particular some or all of the region of overlap 6 of the two parts 4A and 4B (FIG. 2) to be analyzed. By way of illustration, in FIG. 5, a few measurement points M1, M2, M3 on the part 4A of a structure 2 (corresponding for example to the structure of FIG. 2, seen from above) have been shown. For each measurement point, the measurement carried out may be considered as being applicable to a given region (which is for example rectangular or circular) around the measurement point. Orifices 21A to 21F intended to receive fastening elements (not shown) have also been shown in FIG. 5. These orifices are, for example, generated by drilling during a method for assembling the structure and especially during a one-way assembling method.

In the measuring step E1, the ultrasonic measuring unit 7 measures the amplitude of the ultrasonic signal S2 sent back by the structure 2. This measurement of the amplitude is carried out as a function of the time-of-flight, i.e. of the time between the transmission of the ultrasonic signal S1 by the transceiver element 10 and reception (after reflection from the structure 2) of the ultrasonic signal S2 by the transceiver element 10.

The propagation of the ultrasonic signal through the structure 2 is characterized by characteristic (reflection) peaks, which correspond to discontinuities in acoustic impedance in the structure, at the interfaces of different materials, and especially at the interface between the part 4A and the faying-surface mastic 3 and at the interface between the faying-surface mastic 3 and the part 4B.

Figure 6:
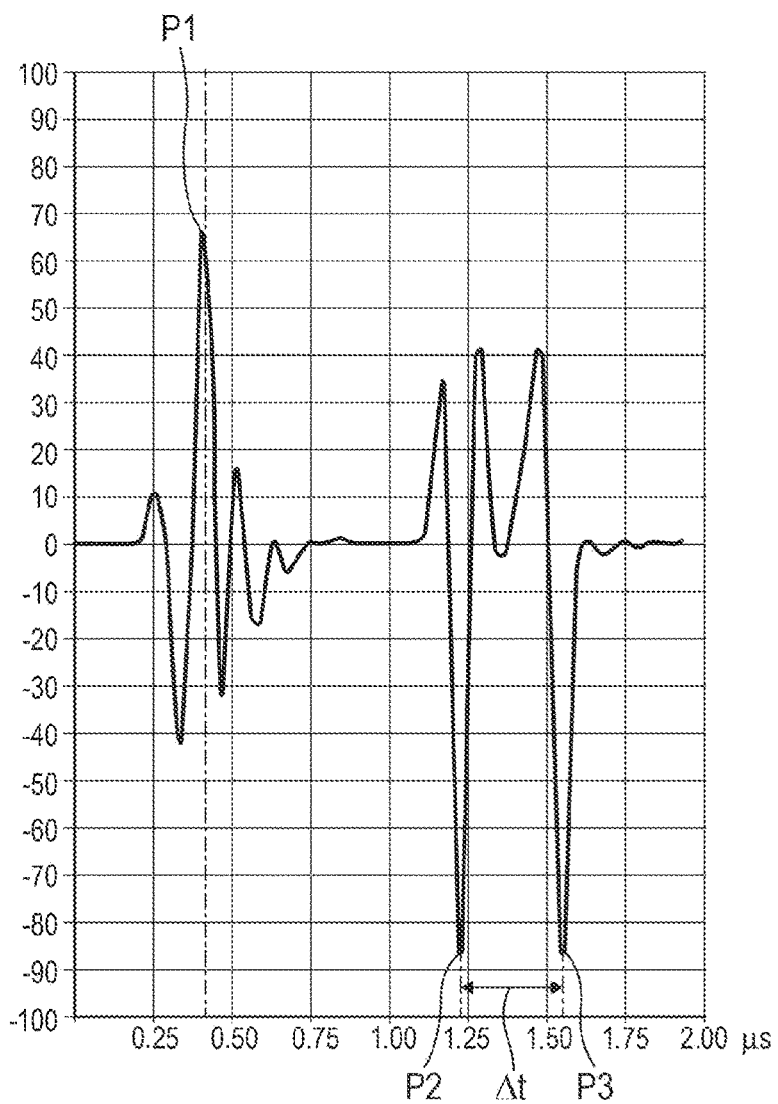
FIG. 6 shows a graph that illustrates the variation in the amplitude of the ultrasonic signal sent back by the structure as a function of time-of-flight.

By way of illustration, in the example of FIG. 6, the curve, which shows the variation in the amplitude of the ultrasonic signal S2 as a function of the time-of-flight (expressed in µs—microseconds) comprises a plurality of characteristic peaks. More particularly, it especially comprises:
   the peak P1, which is the peak of entry into the part 4A, via a coupling liquid (film of water). This peak P1 is normalized, i.e. calibrated to an amplitude higher than or equal to 80%;
   the peak P2, which is the peak of exit from the part 4A and the peak of entry into the faying-surface mastic 3; and
   the peak P3, which is the peak of exit from the faying-surface mastic 3 and the peak of entry into the part 4B.

The difference Δt in time-of-flight between the peaks P2 and P3 therefore corresponds to the round-trip propagation time of the ultrasonic signal through the faying-surface mastic 3. This difference Δt is used in the following processing step E2 of the method P.

The method P therefore also comprises the processing step E2 implemented by the processing unit 13. This processing step E2 consists in determining the thickness of the faying-surface mastic 3 at each of the measurement points M1, M2, M3. In the processing step E2, the processing unit 13 determines the thickness of the faying-surface mastic on the basis of the measurements carried out in the measuring step E1 and especially of said difference Δt at the measurement point in question, and using the predetermined propagation model of faying-surface mastic.

The propagation model is characteristic of the type of faying-surface mastic used and delivers a thickness value (for example expressed in millimeters) of the faying-surface mastic depending on the time-of-flight (for example expressed in µs) of the ultrasonic signal through the faying-surface mastic, and on said auxiliary data. The auxiliary data used may include the following data: temperature; and the time for which the faying-surface mastic has been applied to the structure.

Therefore, by virtue of said propagation model, the processing unit 13 associates, with the time-of-flight Δt through the material of the faying-surface mastic, a thickness value. More precisely, the processing unit 13 determines the thickness E (for example expressed in mm) of the faying-surface mastic 3 using the following relationship:

$$E = (vp \cdot \Delta t)/2$$

in which:
   vp is the speed of propagation (for example expressed in mm/µs), which is defined in the propagation model; and
   Δt is the round-trip propagation time (for example expressed in seconds) of the ultrasonic signal through the faying-surface mastic.

In one embodiment, the speed vp depends on the temperature of the environment in which the structure is located, and on the time for which the faying-surface mastic has been deposited in the structure. Specifically, the speed of an ultrasonic signal through the faying-surface mastic depends on the polymerization of the latter.

By way of illustration, the propagation model may make provision, for one particular type of propagation mastic, for a speed vp of 1.65 mm/µs, after a time of 20 hours (of deposition), for a temperature of 20° C. This speed vp may vary if the temperature conditions and time vary.

The method P also comprises a processing step E3 implemented by the processing unit 17. The processing step E3 consists in deducing, from the thickness E of the faying-surface mastic determined in the processing step E2, a conformity or non-conformity of said faying-surface mastic.

Figure 5:
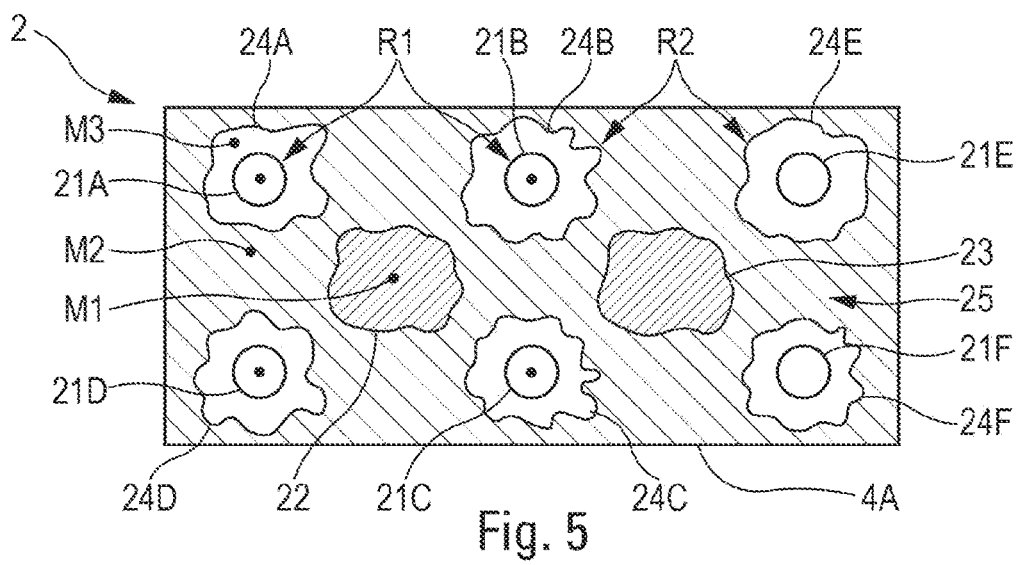
FIG. 5 is a plan view of a structure portion, in which the distribution of a faying-surface mastic has been shown.

To do this, in one particular embodiment, rectangular cells R1 and R2, which rectangular cells are especially square, are taken into account to determine a conformity of the faying-surface mastic, as shown in FIG. 5. Each of the rectangular cells R1 and R2 is defined by four fastening points provided to secure the parts of the structure 2. In FIG. 5, the fastening points are defined by orifices 21A to 21F (which are intended to receive fastening elements). The cell R1 is a rectangle of which the corners are defined by the orifices 21A, 21B, 21C and 21D. Likewise, the cell R2 is a rectangle of which the corners are defined by the orifices 21B, 21C, 21E and 21F.

It is known that correct (or compliant) flow of the faying-surface mastic 3 is characterized by a thickness that is minimum at the fastening elements and a thickness that is maximum at the center thereof, i.e. resulting from an effect referred to as "cushioning".

Thus, the processing step E3 consists in verifying, for each of a plurality of rectangular cells R1, R2 of the structure 23, that the following conditions have been met:
   at the center of the rectangular cell R1, R2, the thickness of the faying-surface mastic 3 is comprised in a first predetermined interval of values, and for example between 0.15 m and 0.2 mm; and
   at the corners (orifices 21A to 21F) of the rectangular cell R1, R2, the thickness of the faying-surface mastic 3 is smaller than a predetermined value, 0.05 mm for example.
   Depending on these verifications:
   if the aforementioned conditions are met for all the cells between the two parts of the structure 2, the processing step E3 concludes that the faying-surface mastic 3 is in conformity; and
   if the aforementioned conditions are not met for all the cells between the two parts of the structure 2, the processing step E3 concludes that the faying-surface mastic 3 is not in conformity.

In the example of FIG. 5, the conditions are considered to have been met. To emphasize this conformity, in FIG. 5 the thickness of the faying-surface mastic 3 has been represented using hatching of variable density. More precisely, in this example:
   regions 24A to 24F (shown in white) around the orifices 21A to 21F (i.e. the corners of the cells R1 and R2), respectively, are devoid of mastic or contain a small and acceptable thickness of mastic. In the example of FIG. 5, the measurement point 3 is located in the region 24A;

regions 22 and 23 (shown densely hatched) at the center of the cells have a large and compliant thickness of faying-surface mastic. In the example of FIG. 5, the measurement point M1 is located in the region 22;

the rest of the region of overlap (shown less densely hatched) has a smaller and compliant thickness of faying-surface mastic. In the example of FIG. 5, the measurement point M2 is located in this region.

By way of illustration, in contrast, in the example of FIG. 5, it could be concluded that the faying-surface mastic is not in conformity in the case of presence of faying-surface mastic of a thickness larger than 0.05 mm in the regions 24A to 24F around the orifices 21A to 21F and/or if the faying-surface mastic at the center of at least one rectangular cell (regions 22 and 23) is larger than 0.2 mm.

In one embodiment, the processing step E3 consists also in determining the presence or absence of swarf in the structure 2. It is known that the presence of swarf around the fastening elements disrupts the natural flow of the faying-surface mastic under mechanical pressure, this disruption being such or being able to be such that the faying-surface mastic then does not meet the required conditions mentioned above. This embodiment allows, by virtue of measurement of the thickness of the faying-surface mastic, swarf, potentially present between the two parts, in particular in proximity to the fastening elements, to be identified and located.

The method P in addition comprises a step E4 of presenting and/or transmitting results (conformity or non-conformity of the faying-surface mastic, presence or absence of swarf and potentially the location thereof) obtained in the processing step E3 to an operator or to a system. These results may be presented by various conventional means in the form of a display or a printout. In one particular embodiment, a map of the analyzed structure may be produced with the faying-surface mastic represented thereon by a set of colors (or color code), the colors depending on the thickness of the faying-surface mastic. This particular embodiment allows an operator to rapidly identify, visually, any problem with conformity from the colors of the map.

Moreover, the method P comprises a preliminary step E0 implemented before the sequence of steps E1, E2, E3 and E4. The preliminary step E0 consists in determining the propagation model of the type of faying-surface mastic used. The type of faying-surface mastic may vary depending on its components, on its properties, etc.

To do this, the faying-surface mastic used is analyzed in order to define the propagation speed of the ultrasonic signal through said faying-surface mastic depending on the time (for example in days or in hours) said faying-surface mastic has spent curing and on the temperature of the environment in which said faying-surface mastic is located. To this end, ultrasonic measurements are carried out on faying-surface mastic (having these properties) integrated into a structure and the thickness of which is known exactly. The time-of-flight of the ultrasonic signal through this thickness of faying-surface mastic is measured, and thus a relationship between the (known) thickness of the faying-surface mastic and the (measured) time-of-flight is obtained, which allows the aforementioned propagation speed vp (for example expressed in mm/µs) to be determined. The ultrasonic measurements may be taken using a measuring unit similar to the ultrasonic measuring unit 7.

A behavioral characterization of the faying-surface mastic used, as a function of the time (in days or in hours) spent curing and of the temperature of the environment (for example between 18° C. and 30° C.) is obtained.

In one particular embodiment, in the preliminary step E0, a propagation model is determined for a plurality of different types of faying-surface mastic. The various obtained models may thus, for example, be incorporated into the database 15 (FIG. 1).

In this particular embodiment, the analyzing method P is able to analyze the conformity of any one of these various types of faying-surface mastic. To do this, it is sufficient for the propagation model corresponding to the type of faying-surface mastic for which the measurements were taken in the measuring step E1 to be used in the processing step E2.

Figure 7:
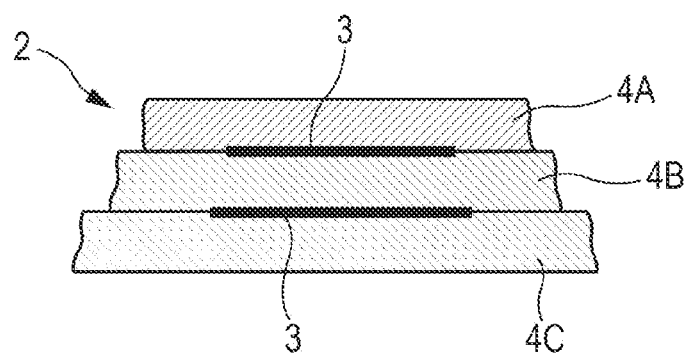
FIG. 7 is a partial cross-sectional view of a particular structure capable of being analyzed by the analyzing device.

In the context of the present invention, the structure 2 that is analyzed may also comprise more than two partially superposed parts, for example three parts 4A, 4B and 4C as shown in FIG. 7, with, each time, one layer of faying-surface mastic 3 arranged between two directly successive superposed parts, namely between the parts 4A and 4B and between the parts 4B and 4C in the example of FIG. 7. In this case, on the basis of the analysis of the ultrasonic signal S2 sent back and especially of the characteristic peaks of this ultrasonic signal S2, it is possible to determine the time-of-flight through each of the layers of faying-surface mastic 3, and thus to deduce therefrom conformity or non-conformity.

Moreover, the method P may be implemented on various types of structure, formed for example: from superposed metal parts; or from superposed composite parts; or from a superposition not only of at least one metal part and but also of at least one composite part.

The device 1 and method P, such as described above, thus have many advantages. In in particular, they allow: with an associated quantification in case of doubt, correct flow of the faying-surface mastic to be guaranteed, without disassembly; and the absence of swarf at the interfaces of the structure to be guaranteed, without disassembly.

The device 1 may be used in various applications.

In a first possible application, the device 1 is used to carry out verifications of conformity during assembly operations, for example of an aircraft, and especially during "one-way assembly" operations. The device 1 allows, in this application, a precise, rapid and reliable verification of the conformity of the faying-surface mastic integrated into the structure and an absence of swarf to be achieved, without disassembling the structure.

In such an application, the device 1 may be used to take measurements at one or more particular measurement points of the structure 2, for example in one or more places where it is considered that there might be a problem with conformity. These measurements may be taken during an assembly operation, or during a subsequent verification.

The device 1 may also be used to take measurements at a plurality of different measurement points of the structure, so as to analyze all of a given area, for example all the area to which the faying-surface mastic has been applied.

In one particular embodiment, at least one ultrasonic measuring unit 7 of the device 1 is mounted on a working head of an, in particular automated, drilling and riveting system. The device 1 thus follows the movements of the working head and is able to carry out analyses in all the places covered by this working head and therefore especially at the fastening points. In this particular embodiment, the processing module 12 of the device 1 may be integrated into a control unit of the drilling and riveting system.

Furthermore, in a second possible application, the device 1 is used to validate new steps or new actions of aircraft assembly operations, and especially of "one-way assembly"

operations. By way of example, the device 1 may be used to validate new fastening elements or a new faying-surface mastic.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method for analyzing conformity of a faying-surface mastic integrated into a structure includes at least two partially superposed parts between which is arranged the faying-surface mastic, the method comprising:
   determining a propagation model of faying-surface mastic and auxiliary data;
   a measuring step, implemented by an ultrasonic measuring unit, including generating a ultrasonic signal, sending the ultrasonic signal to the structure from a measurement point and measuring an amplitude of the ultrasonic signal sent back by said structure as a function of a corresponding time-of-flight of the ultrasonic signal, wherein the measuring step is performed after the determination of the propagation model;
   a first processing step, implemented by a first processing unit, including determining a thickness of the faying-surface mastic at said measurement point based on the measurements of the amplitude and using the propagation model of said faying-surface mastic and said auxiliary data, said propagation model being characteristic of a type of said faying-surface mastic and delivering a thickness value of the faying-surface mastic depending on the time-of-flight of the ultrasonic signal and on said auxiliary data; and
   a second processing step, implemented by a second processing unit, including deducing, from the thickness of the faying-surface mastic, at least a conformity or a non-conformity of said faying-surface mastic.

2. The method as claimed in claim 1, wherein the measuring step includes:
   taking first measurement at a first measurement point of the structure, and the first processing step includes determining a first thickness value of the faying-surface mastic at the first measurement point, and
   taking a second measurement at a second measurement point of the structure, and the first processing step includes determining a second thickness value of the faying-surface mastic at the second measurement point.

3. The method as claimed in claim 1, wherein the second processing step includes determining a presence or absence of a swarf in the structure.

4. The method as claimed in claim 1, wherein the preliminary step includes determining a propagation model for each of a plurality of different types of faying-surface mastic.

5. The method as claimed in claim 1, wherein said auxiliary data comprises: temperature; and a time for which the faying-surface mastic has been integrated into the structure.

6. The method as claimed in claim 1, wherein, the structure includes rectangular cells each defined by fastening points at secure parts of the structure, and
   the method further comprises:
   verifying, for each of the rectangular cells, that the thickness values of the faying-surface mastic includes a predetermined first interval of values at a center of the rectangular cell and that the thickness of the faying-surface mastic is smaller than a predetermined value at corners of the rectangular cell.

7. The method as claimed in claim 1, wherein the measuring step includes generating an ultrasonic signal having a frequency in a range of 10 MHz to 15 MHz.

8. A device for analyzing a conformity of a faying-surface mastic integrated into a structure, wherein the structure includes at least two partially superposed parts between which is arranged the faying-surface mastic,
   wherein the device comprises:
   an ultrasonic measuring unit configured to generate an ultrasonic signal, send the ultrasonic signal to the structure from at least one measurement point, and measure a time-of-flight of the ultrasonic signal and measure an amplitude of the ultrasonic signal reflected by said structure as a function of the time-of-flight of the ultrasonic signal;
   a first processing unit configured to:
   determining a propagation model of faying-surface mastic and auxiliary data;
   determine a thickness of the faying-surface mastic at said measurement point based on the amplitude measured by the ultrasonic measuring unit, and using the propagation model of said faying-surface mastic and auxiliary data, wherein the propagation model is representative of the faying-surface mastic and determine a thickness value of the faying-surface mastic based on the time-of-flight of the ultrasonic signal through the faying-surface mastic and on the auxiliary data; and
   a second processing unit configured to determine, from the thickness value a conformity or a non-conformity of the faying-surface mastic.

9. The device as claimed in claim 8, wherein the second processing unit is further configured to determine a presence or absence of swarf in the structure.

10. A method comprising:
   sending an ultrasonic signal into a structure including a faying-surface mastic integrated sandwiched between parts;
   receiving reflections of the ultrasonic signal by the structure;
   measuring time-of-flights between the sending of the ultrasonic signal and the reflections of the signal;
   measuring amplitudes of a plurality of the reflections as a function of the time-of-flight associated with each of the reflections;
   determining thickness values associated with the faying-surface mastic using the time-of-flights, the amplitudes, a propagation model representative of said faying-surface mastic and auxiliary data; and
   determining whether the faying surface mastic conforms to a thickness criteria based on the thickness values,
   wherein said auxiliary data includes a temperature of the structure, and a time at which the faying-surface mastic was integrated into the structure.

11. The method of claim 10, further comprising detecting peak amplitudes of the amplitudes,
    wherein the determining of the thickness is performed by applying the time-of-flight flights associated with the peak amplitudes to the propagation model.

12. The method as claimed in claim 10, wherein the determining step includes:
    determining a first thickness value of the thickness values of the faying-surface mastic at a first measurement point on the structure, and
    determining a second thickness value of the thickness vales at the second measurement point on the structure, different from the first point,
    the step of determining whether the faying surface mastic conforms to the thickness criteria is based on at least the first thickness value and the second thickness value.

13. The method as claimed in claim 10, further comprising determining a presence or absence of a swarf in the structure based on the thickness values.

14. The method as claimed in claim 10, wherein, the structure includes cells each defined by fastening points at secure parts of the structure,
    wherein the step of determining the thickness values and the step of determining whether the faying surface mastic conforms to the thickness criteria is performed for each of the cells,
    wherein, for each of the cells, the thickness values includes at least a first thickness value associated with a center of the cell and second thickness values associated with corners of the cell, and
    wherein, for each of the cells, the determining whether the faying surface mastic conforms to the thickness criteria is based on the first thickness value and the second thickness values.

* * * * *